United States Patent [19]
Cahen

[11] 4,161,483
[45] Jul. 17, 1979

[54] HYDROGENATION PROCESS

[75] Inventor: Raymond M. Cahen, Brussels, Belgium

[73] Assignee: Labofina S.A., Brussels, Belgium

[21] Appl. No.: 929,540

[22] Filed: Jul. 31, 1978

[30] Foreign Application Priority Data

Dec. 2, 1977 [LU] Luxembourg .......................... 78621

[51] Int. Cl.[2] .......................... C11C 3/12; B01J 31/12
[52] U.S. Cl. .................................... 260/409; 252/430; 252/431 N; 252/438
[58] Field of Search ........... 260/409; 252/430, 431 N, 252/438

[56] References Cited

U.S. PATENT DOCUMENTS 3,240,698 3/1966 Leak .................................... 260/409

OTHER PUBLICATIONS

Brown, et al., Chem. Absts., vol. 79, No. 125719d (1973).

*Primary Examiner*—Patrick Garvin
*Assistant Examiner*—John F. Niebling
*Attorney, Agent, or Firm*—Schwartz, Jeffery, Schwaab, Mack, Blumenthal & Koch

[57] ABSTRACT

A process for partially and selectively hydrogenating a natural oil is disclosed which comprises the step of treating said natural oil in the presence of a nickel catalyst and such an amount of an organic nitrogen-containing basic compound which is equivalent to from about 5 to about 40 atoms of nitrogen per 100 atoms of nickel with hydrogen. By this process, liquid hydrogenation products are obtained and the formation of trans-isomers and/or conjugated dienes and/or saturated compounds is substantially reduced.

8 Claims, No Drawings

HYDROGENATION PROCESS

BACKGROUND OF THE INVENTION

The present invention relates to a process for selectively hydrogenating natural oils, in order to reduce their content in polyunsaturated compounds while limiting the formation of solid compounds.

Some natural or vegetable oils, such as soybean oil, sunflower oil, solza oil, or corn oil, contain compounds having several double bonds (polyenic compounds), for instance three double bonds (trienic compounds), and two double bonds (dienic compounds), in admixture with compounds having only one double bond (monoenic compounds), and saturated compounds. For instance, soybean oil contains triglycerides of fatty acids comprising about 10% linolenic acid (a fatty acid containing 18 carbon atoms and three C = C double bonds), about 50% of linoleic acid (fatty acid containing 18 carbon atoms and two double bonds), about 25% of oleic acid (fatty acid containing 18 carbon atoms and one double bond), and saturated fatty acids (stearic and palmitic acids).

In order to increase the stability of these oils, it is necessary to significantly reduce the content in linolenic acid glycerides and, in part, the content in glycerides of dienic acids. This reduction of the amount of unsaturated compounds is most often carried out by hydrogenation. However, for some applications, for instance for the use of these oils as cooking oils or for preparing fatty acids for paints and coatings, the formation of solid products must be obviated or at least reduced. For these reasons only a partial hydrogenation must take place and this hydrogenation must be selective. It is of prime importance to limit:

(a) the formation of saturated compounds; polyenic compounds must therefore be hydrogenated to dienic and monoenic compounds;

(b) The isomerization of cis- to trans-isomers; however, isomerization occurs always during hydrogenation and this isomerization results in the formation of solid products, since the trans-isomers have a higher melting point than cis-isomers;

(c) the formation of conjugated dienic compounds, which are unstable.

It has already been suggested to carry out the selective hydrogenation of natural oils in the presence of copper catalysts. However, these catalysts have some drawbacks. For instance, it is necessary to avoid the presence of even traces of these catalysts in the partially hydrogenated products, since copper promotes oxidation of these products. Moreover, these copper catalysts are far less active than nickel catalysts. By contrast, hydrogenation in the presence of nickel catalysts in less selective and results in the formation of too high amounts of solid products.

SUMMARY OF THE INVENTION

It is an object of the present invention to provide a hydrogenation process by which these drawbacks are avoided. A further object of this invention is to provide an improved process for partial and selective hydrogenation of the polyenic components of natural oils.

It is another object of the present invention to provide such a process wherein the formation of saturated compounds, of conjugated dienic compounds and of trans-isomers is limited.

In order to accomplish the foregoing objects according to the present invention there is provided a process for partially and selectively hydrogenating a natural oil which comprises the step of treating said natural oil in the presence of a nickel catalyst and such an amount of an organic nitrogen-containing basic compound which is equivalent to from about 5 to about 40 atoms of nitrogen per 100 atoms of nickel with hydrogen at a hydrogen pressure and a reaction temperature sufficient to obtain a substantially liquid hydrogenation product rich in monoenic compounds.

Further objects, features, and advantages of the present invention will become apparent from the following detailed description of the invention and its preferred embodiments.

DETAILED DESCRIPTION OF THE INVENTION AND ITS PREFERRED EMBODIMENTS

The process according to the present invention for partially and selectively hydrogenating natural oils which include compounds containing at least two C = C double bonds, comprises hydrogenating these natural oils in the presence of a nickel catalyst and in the presence of a basic organic nitrogen-containing compound, whereby the amount of the nitrogen-containing organic compound is such that the number of nitrogen atoms per 100 nickel atoms is between about 5 and about 40.

It has been found that hydrogenation of natural oils in the presence of a nickel catalyst and of these nitrogen-containing compounds is particularly selective. Moreover, the yield in desired hydrogenated products is high and a remarkably high reaction rate is achieved.

In order to obtain stable hydrogenated products which are oily, the iodine value of the starting oil (which value for instance is between about 120 and 150 in the case of soybean oil), must be decreased by the hydrogenating treatment, for between about 10 and about 40 units. Furthermore, the content of compounds containing at least three C = C double bonds in the hydrogenated oil must not exceed 2% and the content of fully hydrogenated compounds and trans-isomers must be as low as possible. Furthermore, the formation of unstable conjugated dienic compounds should be avoided.

These requirements are fulfilled by using the process of the present invention. The nickel catalyst may be any nickel catalyst which is currently used in hydrogenating processes. Thus, the nickel catalyst can consist essentially of nickel metal or can be any supported nickel catalyst which comprises nickel on a conventional carrier material, e.g., a commercially available supported nickel catalyst. In this latter case, the major portion of nickel is in the form of metal nickel and the remainder is in the form of nickel oxide. A portion of the nickel which does not generally exceed 10% thereof, may be substituted by a hydrogenation-catalyzing metal or metal oxide, such as cobalt, palladium, cerium oxide, zirconium oxide and the like. The term "nickel catalyst" as applied in the present specification and claims is meant to include catalysts which contain nickel and optionally a lower amount of other hydrogenation-catalyzing components. These catalysts usually contain an inorganic support material which may be an oxide of aluminum and/or silicium such as silica, kieselguhr, alumina, mixtures of silica and alumina, or titanium oxide and the like. Commercial nickel catalysts may be protected by a layer of fatty material.

The amount of catalyst which is used for the selective hydrogenation within the process according to the present invention may vary, depending on many factors, namely on the kind of oil to be treated, on its purity, on the catalyst composition and on the working conditions. An active and selective hydrogenation into hydrogenated oils having the required iodine value is generally achieved when the amount of catalyst is such that the amount of nickel therein is between about 0.01 and about 0.75% relative to the amount by weight of oil. Higher amounts of catalyst could be used, but without providing any economical advantage.

According to the present invention, the catalyzed hydrogenation of the natural oil is carried out in the presence of a basic nitrogen compound. Such basic nitrogen-containing compounds comprise aliphatic and heterocyclic amines containing 1 to about 4 nitrogen atoms and amides which exhibit a basic reaction, e.g. carboxylic acid diamides. The respective basic nitrogen compound may be chosen depending on various factors such as, in particular, availability and price. Nitrogen compounds which may be advantageously employed are urea, hexamethylenetetramine and aliphatic amines containing from 8 to 22 carbon atoms. Amines of lower molecular weight are too volatile, while the use of heavier amines could result in the introduction of solid components into the reaction mixture. Amines having a melting point lower than about 30° C., and preferably lower than about 25° C., are advantageously used, such as for instance commercial lauric amines and coprah amines.

The nitrogen compound is generally used in an amount corresponding to 5–40 atoms of nitrogen per 100 atoms of nickel.

The hydrogenating reaction is carried out at a pressure which may vary within wide limits. Generally, the hydrogen pressure is between about 0.5 and about 10 kg/cm2. This range is particularly suitable to obtain a hydrogenated oil which fulfills the above mentioned requirements. The reaction temperature may vary between about 100° and about 175° C. According to a preferred embodiment of the process of the present invention, hydrogenation is carried out at a temperature of between about 115° and about 150° C. and under a hydrogen pressure of between about 0.5 and and about 7 kg/cm2.

The following examples are given to further illustrate the present invention, yet without limiting it.

EXAMPLE 1

A 20 l reactor is charged with 10 l of soybean oil, a nickel catalyst (23.5 wt. % of nickel, 12 wt. % of kieselguhr, and 64.5 wt. % of a protective fatty layer) and a mixture of coprah amines (primary alkyl amines containing 5% of $C_8$ amines, 7% of $C_{10}$ amines, 48% of $C_{12}$ amines, 18% of $C_{14}$ amines, 12% of $C_{16}$ amines, and 10% of $C_{18}$ amines) (m.p : 16° C.).

The catalyst is used in an amount corresponding to 0.1% of nickel, based on the weight of soybean oil, and the nitrogen compound is used in an amount corresponding to 10 atoms of nitrogen per 100 atoms of nickel.

The reaction is carried out at 140° C. Hydrogen is introduced into the reactor until a pressure of 3 kg/cm2 is reached, and a hydrogen flow rate of 4 m3/hours is maintained during the reaction.

The reaction is stopped when the refractive index of the hydrogenated oil is about 15° 50′, said index is corresponding to a hydrogenated oil which exhibits an iodine value of 100. The reaction period is 81 minutes.

For the analysis, a transesterification of the oil with methanol is first carried out in a conventional manner and then the methyl esters are separated by chromatography, in order to determine the composition and the proportions of the acids of the oil. The determination of the amount of trans-isomers is carried out by infra-red spectrometry, measuring the intensity of the peak at 10.3μ. The intensity of this peak is compared with the intensity of the peak of the methyl ester of elaidic acid (trans-isomer of the acid having a straight chain with 18 carbon atoms and containing one C = C double bond).

The characteristics of the oil before and after hydrogenation are given in the following Table (percentages by weight).

| Characteristics | | Starting Oil | Hydrogenated Oil |
|---|---|---|---|
| Acid components: | $C_{18:0}$[a] | 4.0% | 5.9% |
| | $C_{18:1}$ | 22.0% | 51.2% |
| | $C_{18:2}$ | 55.6% | 28.4% |
| | $C_{18:3}$ | 7.2% | 0.7% |
| Trans-isomers | | — | 15% |
| Conjugated dienes | | 0.24% | not detectable |
| Iodine value | | 131 | 100 |
| Content of solid products (at 20° C.) | | — | 1.1% |

[a]the figures 0, 1, 2, and 3 designate the number of C = C double bonds in the acid.

By way of comparison, the same procedure is repeated, but without adding the nitrogen compound. The hydrogenated oil contains 6.47 wt. % of solid products (at 20° C.).

EXAMPLE 2:

The procedure of Example 1 is repeated, but at 120° C. and using urea instead of the alkyl amines. Urea is used in an amount corresponding to 7 atoms of nitrogen per 100 atoms of nickel. The reaction period is 62 minutes.

The hydrogenated oil has the following characteristics:

| | |
|---|---|
| $C_{18:0}$ | 7.3 wt. % |
| $C_{18:1}$ | 49.6 wt. % |
| $C_{18:2}$ | 28.4 wt. % |
| $C_{18:3}$ | 1.0 wt. % |
| Trans-isomers | 14.4 wt. % |
| Conjugated dienes | not detectable |
| Solid products (at 20° C.) | 1.8 wt. % |
| Iodine value | 100. |

EXAMPLE 3

The procedure of Example 1 is repeated, but using hexamethylenetetramine (in an amount corresponding to 20 atoms of nitrogen per 100 atoms of nickel) instead of the alkyl amines. The reaction period is 68 minutes.

The hydrogenated oil has the following characteristics:

| | |
|---|---|
| $C_{18:0}$ | 8.9 wt. % |
| $C_{18:1}$ | 47.7 wt. % |
| $C_{18:2}$ | 28.8 wt. % |
| $C_{18:3}$ | 1.1 wt. % |
| Trans-isomers | 15.6 wt. % |
| Conjugated dienes | not detectable |
| Solid products (at 20° C.) | 2.6 wt. % |

-continued

| | |
|---|---|
| Iodine value | 100. |

EXAMPLE 4

The procedure of Example 1 is repeated, but using a nickel catalyst containing 22.7 wt. % of nickel, 1.4 wt. % of zirconium oxide, 11.8 wt. % of kieselguhr, and 64.1 wt. % of a protective fatty layer, a nitrogen compound consisting of lauric amine (94% of $C_{12}$, 3% of $C_{10}$, and 3% of $C_{14}$) (m.p. : 24° C.), in an amount corresponding to 30 atoms of nitrogen per 100 atoms of nickel.

The hydrogenated oil has the following characteristics:

| | |
|---|---|
| $C_{18:0}$ | 5.75 wt % |
| $C_{18:1}$ | 49.8 wt. % |
| $C_{18:2}$ | 30.0 wt. % |
| $C_{18:3}$ | 1.0 wt. % |
| Trans-isomers | 17.0 wt. % |
| Conjugated dienes | 0.09 wt. % |
| Solid products (at 20° C.) | 1.45 wt. % |
| Iodine value | 100 |

What is claimed is:

1. A process for partially and selectively hydrogenating a natural oil which comprises the step of treating said natural oil in the presence of a nickel catalyst and such an amount of an organic nitrogen-containing basic compound which is equivalent to form about 5 to about 40 atoms of nitrogen per 100 atoms of nickel with hydrogen at a hydrogen pressure and a reaction sufficient to obtain a substantially liquid hydrogenation product rich in monoenic compounds and with a low content in trans-isomers, conjugated dienic compounds and saturated compounds.

2. The process as defined in claim 1, wherein the nitrogen-containing compound is selected from the group consisting of urea, hexamethylenetetramine, aliphatic amines containing from about 8 to about 22 carbon atoms, and mixtures thereof.

3. The process as defined in claim 2, wherein the aliphatic amines have a melting point lower than about 30° C.

4. The process as defined in claim 3, wherein the aliphatic amines have a melting point lower than about 25° C.

5. The process as defined in claim 1, wherein the reaction temperature is between about 100° and about 175° C.

6. The process as defined in claim 1, wherein the hydrogen pressure is between about 0.5 and about 10 kg/cm2.

7. The process as defined in claim 1, wherein the treatment with hydrogen is carried out until the iodine value of the hydrogenation product is from about 10 to about 40 units lower than the iodine value of the starting oil.

8. A hydrogenated natural oil which is obtained by the process as defined in claim 1.

* * * * *